T. A. & A. F. FISHER.

Fifth Wheel.

No. 64,299.

Patented Apr. 30, 1867.

Witnesses:
Thos Tusche
J. A Service

Inventor;
A F & T A Fisher
Per Munn
Attorneys

United States Patent Office.

T. A. AND A. F. FISHER, OF BEARDSTOWN, ILLINOIS.

Letters Patent No. 64,299, dated April 30, 1867.

---

IMPROVEMENT IN CARRIAGES.

---

The Schedule referred to in these Letters Patent and making part of the same.

---

TO ALL WHOM IT MAY CONCERN:

Be it known that we, T. A. FISHER and A. F. FISHER, of Beardstown, in the county of Cass, and State of Illinois, have invented a new and useful Improvement in Carriages; and we do hereby declare that the following is a full, clear, and exact description thereof, which will enable others skilled in the art to make and use the same, reference being had to the accompanying drawings, forming part of this specification, in which—

Similar letters of reference indicate like parts.

Our invention has for its object to so improve the manner of connecting the forward axle to the body of the carriage that the weight of said parts may be diminished, at the same time that the strength and safety of the connection are increased; and it consists in the jointed king-bolt, in combination with the fifth wheel and forward axle of the carriage, and with a spring connecting-bar attached to the body of the carriage; and in the combination of a jointed connecting or coupling-rod with the fifth wheel and with the arm or brace attached to the carriage body, and to the lower end of which the rear end of the said coupling-rod is swivelled.

Figure 1:
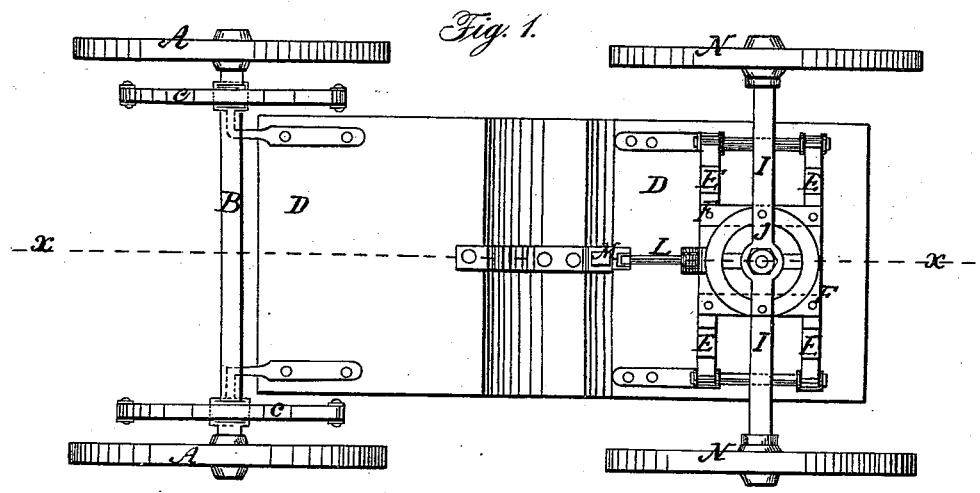
Figure 1 is an under side view of a carriage having our improvements attached.
Figure 2:
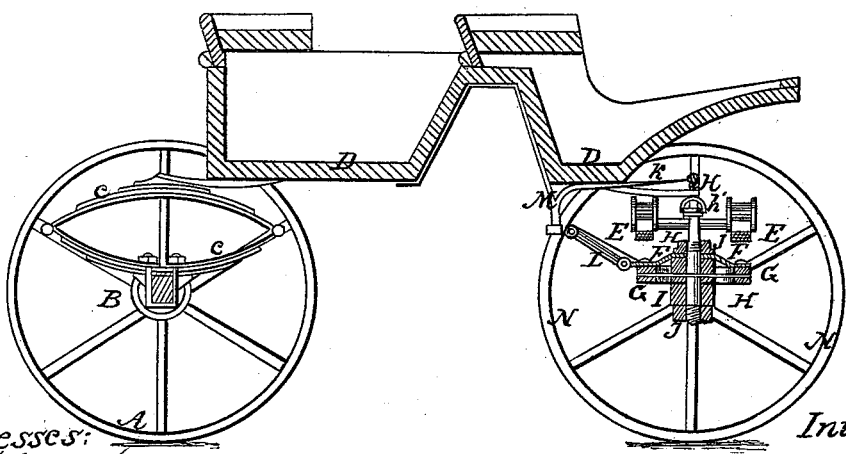
Figure 2 is a vertical longitudinal section of the same, taken through the line $x\,x$, fig. 1.

A are the rear wheels; B, the rear axle; C, the rear springs of the carriage. D is the carriage-body, the rear end of which is connected with the springs C in the usual manner. The forward end of the carriage-body D is hung from the ends of the half-elliptic springs E, the middle parts of which are secured to the framework F, attached to the fifth wheel G of the carriage. The king-bolt H passes through the frame F, the fifth wheel G, and the forward axle I, and may be secured in place by nuts J screwed upon the said bolt, the one above the frame F and the other below the axle I, as shown in fig. 2. The upper part of the king-bolt H is jointed, as shown at the point $h'$, fig. 2, and its upper end is pivoted to the end of the spring-bar K, the other end of which is securely attached to the body D of the carriage. This construction retains the upper end of the king-bolt always in its proper relative position, and at the same time allows the bolt to move freely in any direction, as required by the unevenness of the ground over which the carriage is passing, and prevents the bolt from being affected by the spring of the carriage. The forward axle I is kept from being drawn forward by the coupling or connecting-rod L, the forward end of which is attached to the fifth wheel G, and its rear end connected to the arm or brace M, descending from and securely attached to the body D of the carriage. The coupling-rod L has two joints formed in it, and its rear end is swivelled to the lower end of the brace or arm M, so as not to interfere with the spring of the carriage, and so as to allow the forward wheels N to take any necessary position in passing over uneven ground without interfering with the position of the carriage-body D.

Having thus described our invention, what we claim as new, and desire to secure by Letters Patent, is—

1. The jointed king-bolt H, in combination with the fifth wheel and forward axle, and with the spring K, attached to the carriage-body D, substantially as herein shown and described and for the purpose set forth.

2. The combination of the jointed coupling-rod L with the fifth wheel G, to which its forward end is attached, and with the brace or arm M, to the lower end of which its rear end is swivelled, substantially as herein shown and described and for the purpose set forth.

T. A. FISHER,
A. F. FISHER.

Witnesses:
THOS. H. CARTER,
HENRY PHILLIPS.